Nov. 3, 1959  C. G. ROSE  2,911,097
SCREEN
Filed Oct. 20, 1958
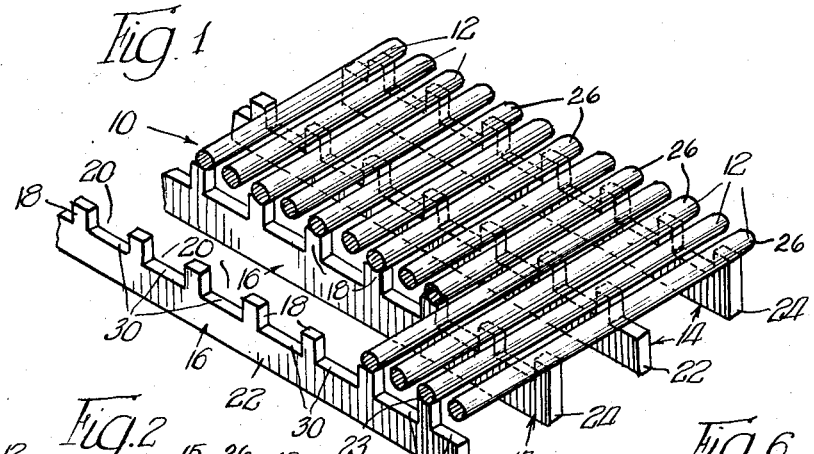
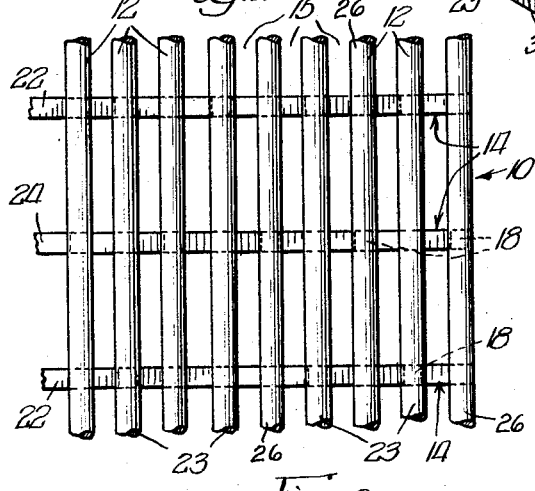
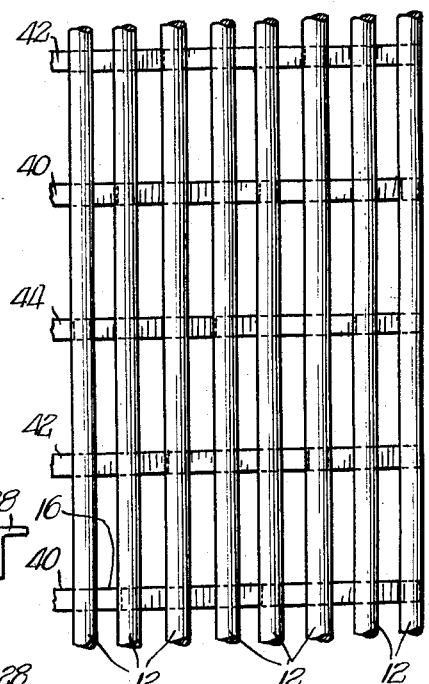
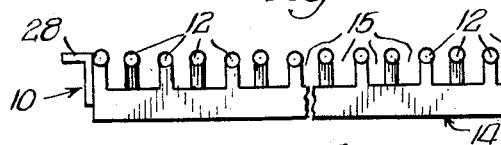
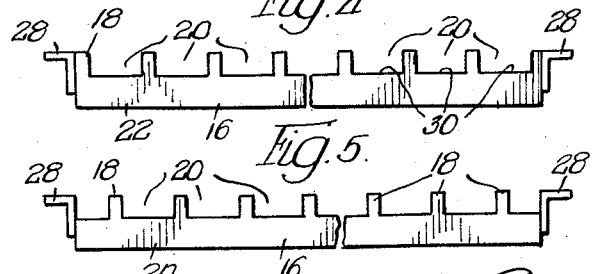
INVENTOR.
Colin C Rose,
BY U
United States Patent Office 2,911,097
Patented Nov. 3, 1959

2,911,097
SCREEN

Colin G. Rose, Galesburg, Ill., assignor to Bixby-Zimmer Engineering Company, Galesburg, Ill., a partnership Application October 20, 1958, Serial No. 768,260

7 Claims. (Cl. 209—393)

This invention pertains to screens and other similar structures and particularly to a screen especially suited to the sorting and grading of solids including the separation of liquids from solids.

The technical advance of methods of processing and manufacturing has required greater proficiency in the sorting of commodities, including the sizing of solids and the separation of liquids from solids, in numerous fields such as mining, smelting, chemical, foods, and the like. Most of the liquid and solids separations are done on screened surfaces as used in machinery such as vibrating screens, trommels, filters, and the like. These screen surfaces are of numerous types and include woven wire, punched plate, assembled rods, welded wire or rods, and the like, arranged to produce square, round, rectangular, and various other shaped slots of a predetermined size, to allow liquids and solids to pass therethrough.

A serious problem encountered in the sorting of commodities is the loading up of particles on the screen surface. By loading up is meant the particles which for some reason become immobilized and block the screen surface so as to interfere with the efficient operation of the screen. One factor contributing to the loading up is the wedging of the particles between the elements comprising the screen surface. When the particles become so tightly wedged that they are not dislodged even by the vibrations normally imparted to the screen or the movement of material across the screen, it can be seen that the wedged particles could interfere with the efficient operation of the screen. One type of operation in which this problem is particularly acute is the sorting and grading of minerals such as ores, coal, and the like. In this type of operation the particles are relatively large, probably more properly called chunks, and are rather irregular in shape. As a result of the irregularity, these large particles will in many instances fall a substantial part of the way through the screen but will become lodged there due to projections which extend beyond the limits of the spaces defined by the screen elements. Often the mean or average size of the wedged particle would fall within the range of sizes that should ordinarily pass through the screen.

Another factor that contributes to this problem is the positioning of the cross members which interconnect and support the aforementioned rod members. These cross members in conventional screens are positioned flush or in closely spaced relationship with the rod members in such a manner that a portion of the screen area is blocked. In these blocked areas the particles tend to become lodged or wedged in place so as to interfere with the operation of the screen.

For these reasons among others I have invented a new type of screen having a foremost feature and object of minimizing the loading up of retained particles due to wedging between the screen elements and to lodging on the cross members. The invention may be broadly characterized as a screen in which the rod members are in effect supported by columnar members, as compared to the conventional cross members so that the spaces between the rod members are substantially interrupted and in which the rod members are provided with a limited amount of flexibility so that the spaces between adjacent rod members may be varied a limited amount.

Another object of the invention resides in the provision of a screen that is especially suited for the grading of commodities according to size.

Another object of the invention is the provision of a screen of a new and novel construction.

These and other objects of the invention will be apparent upon reading of the specification with reference to the following drawings.

In the drawings:

Figure 1 is a fragmentary section in perspective of a screen embodying the invention.

Figure 2 is a fragmentary plan view of the screen shown in Figure 1.

Figure 3 is an end view of the screen embodying the invention.

Figure 4 is a front view of one type of crossbar used in the construction of the screen as shown in Figure 1.

Figure 5 is a front view of a second type of crossbar used in the construction of the screen shown in Figure 1.

Figure 6 is a fragmentary plan view of a modification of the screen embodying the invention.

The arbitrary names of rods and crossbars have been selected for two of the elements used in the construction of the screen embodying the invention. It is to be understood that these names are not to be construed as limitations as to size and character of these elements and that their respective dimensions may be varied to suit the particular application.

Referring now to Figure 1, there is shown one form of the screen embodying the invention generally denoted by the numeral 10. The screen 10 is composed of a plurality of rods 12 which extend lengthwise of the screen section. While the rods are shown as being of circular cross-section, it is to be understood that this is merely by way of example and that the cross-section may be of any configuration. Generally the rods 12 are mounted in the direction in which the material moves over the screen. These rods 12 are maintained in a closely spaced relationship by crossbars generally denoted by the numeral 14. The crossbars 14 are adapted to be received in a supporting frame of the screening machinery (not shown). The rods 12 may be secured to the crossbars 14 by any suitable means such as welding, soldering, brazing, tying, or by mechanical means such as screws, clips or other methods, as will be seen later on.

It should be pointed out that the rods 12 and the crossbars 14 may be constructed of any suitable material. Generally it is desirable that these elements be constructed of materials that will withstand relatively severe repeated shocks and are substantially resistant to wear. Two alloys which are particularly suited for this type of use are the stainless steels and the carbon steels. However, other materials may be used to suit the particular application.

Referring now to Figures 1, 2 and 3, it can be seen that the rods 12 are arranged in a substantially parallel, regularly spaced relationship. In this particular instance the rods 12 form a plurality of elongate spaces 15 through which the graded material may fall. The spaces 15 may be of any size necessary to provide the grading desired.

As was mentioned previously, the rods 12 are in effect maintained in a spaced relationship from the cross members 14. Referring now to Figures 1 and 3, it can be seen that the cross members 14 are composed of an elongate serrated bar 16 having the projections 18 extending therefrom, and the serrations or spaces 20. The projections 18 are for mounting and supporting the rod members 12 in a spaced relationship from the bar portion 16. The rods may be affixed to the projections 18 in any suitable manner, such as welding, brazing, screws, and/or rivets, as was previously described.

It can be seen that the spaces or serrations 20 between the projections 18 are substantially twice the distance between the rods 12 as shown in Figure 3. As a result of this arrangement, the projections 18 on the cross member 22 are coincident with alternating rod members 23. The second cross member 24, shown in Figure 1, is positioned so that the projections 18 are coincident with the intervening rod members 26.

Referring now to Figures 4 and 5, there are shown front elevational views of the cross members 22 and 24 respectively. The cross member 22, as best shown in Figure 4, includes the projections 18 as was disclosed previously. In this particular embodiment the projections 18 are coincident with the ends of the elongate bar portion 16. In the embodiment shown in Figure 5, the projections 18 are spaced from the ends of the elongate bar portion 16. In both embodiments the projections are spaced substantially twice the distance between adjacent rods. In this manner when the ends of adjacent crossbars 22 and 24 are aligned, the projections 18 are arranged in the previously disclosed alternating relationship.

A flange member 28 is secured to the ends of the cross members 14 for facilitating mounting of the screens. However, it should be kept in mind that the flange members 28 are merely by way of example and are not necessary to the practice of the invention.

Referring back to Figure 1, it can be seen that the crossbars 22 and 24 are arranged in alternating relationship. As a result of this arrangement, the rod members 12 are secured to alternating crossbars. Thus, the rod members 23 are fixed with respect to the crossbars 22 as can be seen in the drawings. The intervening rod members 26 are unsecured to the cross members 22 and may be flexed with respect thereto and the adjacent rod members 23. Similarly, the rod members 23 are flexible with respect to the crossbars 24 and the rod members 26 secured thereto.

One constructional feature that should be mentioned at this time is the size relationship between the rod members 12 and the projections 18. As was mentioned previously, one of the features of the invention is to prevent the loading up of the screen due to lodging of particles on the cross members. This feature is perhaps best facilitated by the construction of the projections 18 so that they are approximately the same size or less with respect to transverse width and the cross-sectional diameter of the rods affixed thereto. In this manner it is possible to eliminate or at least minimize any projections or lands on which particles might tend to become lodged. To further facilitate this feature the upper surfaces of the projections may be curved in order to be complementary with the rod members 12 so as to provide a continuous transition between the two. A still further possibility is that any space between the projections 18 and the rod members 12 may be filled in with welding material, brazing or the like, in order to eliminate any cavities that might tend to accumulate or retain screen particles. In any event the modification shown in Figure 1 may be broadly characterized with respect to the spaces 20 as being substantially equal to the distance between adjacent peripheries of alternating rod members.

It can now be seen that the bar portion 16 is in effect mounted in a spaced relationship from the rod members 12. In this manner the screened material can freely fall through the spaces 16 without tending to become lodged on the cross members 14. While there will be a few small particles lodging on the surfaces 30 between the projections 18, it can be seen that these surfaces 30 are spaced a sufficient distance in order that such particles do not interfere with the operation of the screen. In fact, if it should be desired to eliminate all retention of screened particles on the crossbars, it would be conceivable to construct the bars in such a manner that the surfaces 30 are substantially knifelike in appearance. This latter construction would eliminate any surface on which the screened particles could lodge or be retained.

As was mentioned previously, the alternating relationship of the cross bars 14 with respect to the rod members 12 permits a certain amount of limited flexibility between adjacent rod members. Thus, if a particle were to become wedged between any two adjacent rod members due to projections which extend beyond the limits of the spaces defined by the rod members, the limited flexibility in many instances will be sufficient to permit the rod members to flex in order that the particle can fall the remainder of the way through the screen. In many instances such particles will have an average or mean size that would ordinarily fall within the range of sizes that should pass through the screen. As a result it can be seen that permitting the wedged particle to fall would generally be of little detriment to the accuracy of the screening operation.

Thus it can be seen that the screen embodying the invention will substantially eliminate the loading up or retention of particles due to wedging between adjacent rod members and lodging on the cross members that secure the rod members together.

While the cross members have been represented as a serrated bar having a plurality of projections, it is to be understood that this is merely by way of example. In its broadest scope the invention contemplates the supporting of the rod members by a plurality of spaced columnar members in which the columnar members are coincident with intermittent rod members in any intersecting right angle plane. The columnar members may be interconnected so as to be supported and maintained in their spaced relationship in any suitable manner, one example of which are the cross bars 14. The spaced columnar members provide a screen relatively free of obstructions above and below and having substantially uninterrupted spaces between the rod members of which it is composed.

Referring now to Figure 6, there is shown a modification of the screen embodying the invention. This modification includes a plurality of rod members 12 maintained in a spaced substantially parallel relationship so as to form the spaces 15 therebetween. In this embodiment the rod members 12 are maintained in their spaced relationship by the cross members 14 which are designated 40, 42, and 44. The cross members 40, 42, and 44 are substantially the same as those shown in Figures 4 and 5, with the exception that the projections 18 are spaced so as to be coincident with every third rod member 12. For example, the cross member 40 will be coincident with the first, fourth, and seventh rod members, and all others thereafter in that progression. The cross member 42 is coincident with the third, sixth, and all other rod members in that progression. The cross member 44 is coincident with the second, fifth and eighth and all others in that progression. This arrangement permits somewhat greater flexibility between adjacent rod members and at the same time provides the support necessary for the rod members 12. It will be noticed in Figure 6 that the cross members are arranged in a regular pattern so that each cross member occurs every third time.

While two specific embodiments have been disclosed herein, it should be kept in mind that numerous arrangements may be used in the practice of the invention. These arrangements may be regular patterns such as that shown in Figures 1 and 6 or they may be a random arrangement in which there is no particular pattern of support between the cross members and the rod members.

Although specific embodiments of the invention have been shown, it is to be understood that these are merely by way of example and in no manner to be construed as limitations. It is contemplated that certain modifications may be made within the scope of the claims without departing from the spirit of the invention.

What is claimed is:

1. A screen comprising a plurality of spaced substantially parallel rod members maintained in a substantially planar arrangement and a plurality of columnar members secured to said rod members for supporting the same, said columnar members being spaced so that the columnar members occurring in any plane intersecting said rod members at right angles thereto are secured to intermittent rod members in said right angle plane.

2. A screen comprising a plurality of spaced substantially parallel rod members maintained in a substantially planar arrangement, and a plurality of columnar members secured to said rod members and each having substantially the same transverse width as said columnar members, said columnar members being spaced so that the columnar members occurring in any plane intersecting said rod members at right angles thereto are secured to intermittent rod members in said right angle plane.

3. A screen comprising a plurality of spaced substantially parallel rod members, and a plurality of spaced support members, each of said support members composed of a serrated bar extending transversely of said rod members and having a plurality of projections for mounting said rod members in spaced relationship from said bar members, said projections being coincident with intermittent rod members.

4. A screen comprising a plurality of regularly spaced substantially parallel rod members and a plurality of spaced support members, each of said support members composed of a serrated bar extending transversely of said rod members and having a plurality of projections for mounting said rod members in spaced relationship from said bar members, said projections being spaced at multiples of the spaces between said rod members so that said projections are coincident with intermittent rod members.

5. A screen comprising a plurality of regularly spaced substantially parallel rod members and a plurality of spaced support members, each of said support members composed of a serrated bar extending transversely of said rod members and having a plurality of projections for mounting said rod members in spaced relationship from said bar members, said projections being spaced at multiples of the spaces between said rod members so that said projections are coincident with intermittent rod members, whereby the intervening noncoincident rods are spaced from said bar portion and are adapted to be flexed with respect to said coincident rods.

6. A screen comprising a plurality of regularly spaced substantially parallel rod members and a plurality of spaced support members, each of said support members composed of a serrated bar extending transversely of said rod members and having a plurality of projections for mounting said rod members in spaced relationship from said bar members, said projections being spaced at multiples of the spaces between said rod members so that said projections are coincident with intermittent rod members, whereby the intervening noncoincident rods are spaced from said bar portion and are adapted to be flexed with respect to said coincident rods, said noncoincident rods being coincident with the projections on other support members and secured thereto.

7. A screen comprising a plurality of regularly spaced substantially parallel rod members and a plurality of spaced support members, each of said support members composed of a serrated bar extending transversely of said rod members and having a plurality of projections for mounting said rod members in spaced relationship from said bar members, a first group of said support members in which said projections are coincident with alternate rod members and a second group of said support members alternating with said first group in which said projections are coincident with intervening rods not coincident with said first group.

References Cited in the file of this patent

UNITED STATES PATENTS 2,129,428    Johnson _____ Sept. 6, 1938

FOREIGN PATENTS 1,102,336    France _____ Oct. 19, 1955